(12) United States Patent
Sanders

(10) Patent No.: US 11,000,146 B2
(45) Date of Patent: May 11, 2021

(54) PAD FOR USE IN A COFFEE MAKER

(71) Applicant: Koninklijke Douwe Egberts B.V., Utrecht (NL)

(72) Inventor: Johannes Cornelis Sanders, Utrecht (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 211 days.

(21) Appl. No.: 14/586,159

(22) Filed: Dec. 30, 2014

(65) Prior Publication Data

US 2015/0344220 A1    Dec. 3, 2015

Related U.S. Application Data

(63) Continuation of application No. PCT/NL2013/050510, filed on Jul. 5, 2013.

(30) Foreign Application Priority Data

Jul. 5, 2012 (NL) ...................................... 2009133

(51) Int. Cl.
*A47J 31/06* (2006.01)
*A47J 31/40* (2006.01)
*B65D 85/804* (2006.01)

(52) U.S. Cl.
CPC ......... *A47J 31/0668* (2013.01); *A47J 31/407* (2013.01); *B65D 85/8046* (2013.01)

(58) Field of Classification Search
CPC .............. B65D 85/8046; B65D 85/804; B65D 85/8043; A47J 31/0668; A47J 31/407

(Continued)

(56) References Cited

U.S. PATENT DOCUMENTS 2,206,058 A    7/1940  Slayter et al.
2,382,290 A    8/1945  Callander
(Continued)

FOREIGN PATENT DOCUMENTS

CN    101026979 A    8/2007
EP    0 904 717 A1    3/1999
(Continued)

OTHER PUBLICATIONS

Written Opinion for PCT Application No. PCT/NL2013/050510, dated Oct. 17, 2013, 10 pages.

(Continued)

*Primary Examiner* — Erin E McGrath
(74) *Attorney, Agent, or Firm* — Foley & Lardner LLP

(57) ABSTRACT

A pad, for use in a coffee-maker for preparing 1 or 2 cups of beverage, includes an envelope with an inner space which is filled with a beverage preparation product for preparing the beverage. The beverage preparation product comprises a product to be extracted with a fluid (and/or a product soluble in a fluid). The envelope is formed by a first disc-shaped sheet and a second disc-shaped sheet which are interconnected adjacent their longitudinal edges. The interconnected parts of the first sheet and the second sheet form a sealing seam wherein the first sheet and the second sheet each form a filter which can pass a fluid and which forms a barrier to the product to be extracted. The second sheet is of form-retaining design. In use with the coffee-maker, a fluid such as water is supplied under pressure to the pad so that the fluid is pressed through the pad for obtaining a beverage which thereupon leaves the pad.

51 Claims, 9 Drawing Sheets

(58) Field of Classification Search
USPC .......................................................... 99/295
See application file for complete search history.

(56) References Cited

U.S. PATENT DOCUMENTS

| | | | | |
|---|---|---|---|---|
| 3,445,237 | A * | 5/1969 | Gidge | A23F 5/125 |
| | | | | 206/0.5 |
| 5,573,841 | A * | 11/1996 | Adam | D04H 1/425 |
| | | | | 28/103 |
| 6,025,000 | A | 2/2000 | Fond et al. | |
| 6,183,814 | B1 * | 2/2001 | Nangeroni | C09D 167/04 |
| | | | | 427/361 |
| 6,645,584 | B1 * | 11/2003 | Kuusipalo | B32B 27/10 |
| | | | | 156/244.11 |
| 9,028,897 | B2 | 5/2015 | Nakagiri et al. | |
| 2001/0050002 | A1 | 12/2001 | Bonanno | |
| 2004/0005384 | A1 * | 1/2004 | Cai | A47J 31/0647 |
| | | | | 426/77 |
| 2004/0105941 | A1 * | 6/2004 | Terada | B65D 3/22 |
| | | | | 428/34.2 |
| 2004/0115310 | A1 * | 6/2004 | Yoakim | B65D 85/8046 |
| | | | | 426/77 |
| 2009/0232944 | A1 * | 9/2009 | MacMahon | B65D 85/8046 |
| | | | | 426/78 |
| 2009/0311384 | A1 * | 12/2009 | MacMahon | A23C 11/08 |
| | | | | 426/78 |
| 2010/0196545 | A1 * | 8/2010 | Buffet | B65D 85/8043 |
| | | | | 426/79 |
| 2011/0151060 | A1 * | 6/2011 | Nakagiri | A47J 31/0642 |
| | | | | 426/77 |
| 2011/0185911 | A1 * | 8/2011 | Rapparini | B65D 85/8043 |
| | | | | 99/295 |
| 2012/0051672 | A1 * | 3/2012 | Foss | D04H 1/435 |
| | | | | 383/105 |
| 2012/0085661 | A1 * | 4/2012 | Eriksson | B65D 65/466 |
| | | | | 206/204 |
| 2013/0001289 | A1 * | 1/2013 | Tedford | B65D 81/3874 |
| | | | | 229/403 |
| 2013/0108752 | A1 * | 5/2013 | Kollep | B30B 11/08 |
| | | | | 426/394 |
| 2013/0209621 | A1 * | 8/2013 | Nakagiri | B65D 85/8043 |
| | | | | 426/115 |

FOREIGN PATENT DOCUMENTS

| | | |
|---|---|---|
| EP | 0 904 717 A1 | 3/1999 |
| EP | 2 594 170 A1 | 5/2013 |
| NZ | 243239 | 6/1994 |
| WO | WO-03/002423 A1 | 1/2003 |
| WO | WO-2005/092160 A1 | 10/2005 |
| WO | WO-2006/038227 A1 | 4/2006 |
| WO | WO 2006/066621 A1 | 6/2006 |
| WO | WO 2006/066621 A1 | 6/2006 |
| WO | WO 2010/126365 A1 | 11/2010 |
| WO | WO 2012/004878 A1 | 1/2012 |
| WO | WO 2012/004878 A1 | 1/2012 |
| WO | WO 2012/027539 A2 | 3/2012 |
| WO | WO 2012/027539 A2 | 3/2012 |
| WO | WO 2014/007639 A1 | 1/2014 |

OTHER PUBLICATIONS

Lim, H., "A Review of Spun Bond Process," Journal of Textile and Apparel, Technology and Management, vol. 6, Issue 3,13 pages (Spring 2010).
Brazilian Written Opinion and English-language translation, App. No. BR112014033063-8, 6 pages (dated Oct. 22, 2019).
Canadian Office Action, App. No. 2,877,945, 6 pages (dated Apr. 5, 2019).
European Examination Report, App. No. 13739869.9, Koninklijke Douwe Egberts B.V. (dated Mar. 30, 2020).
Canadian Examination Report, App. No. 2,877,945, Koninklijke Douwe Egberts B.V. (dated Dec. 17, 2019).

* cited by examiner

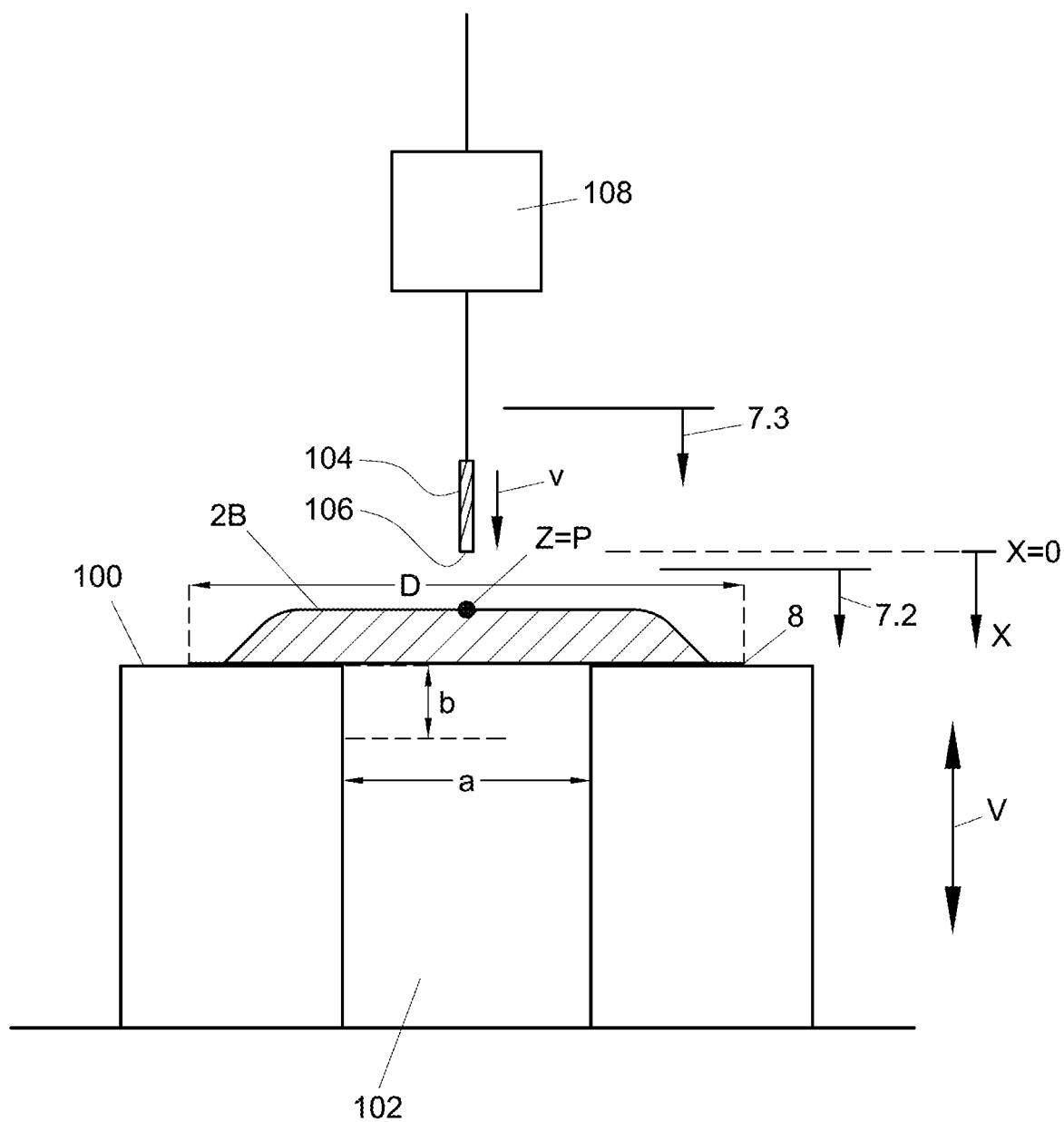
Fig. 7.1

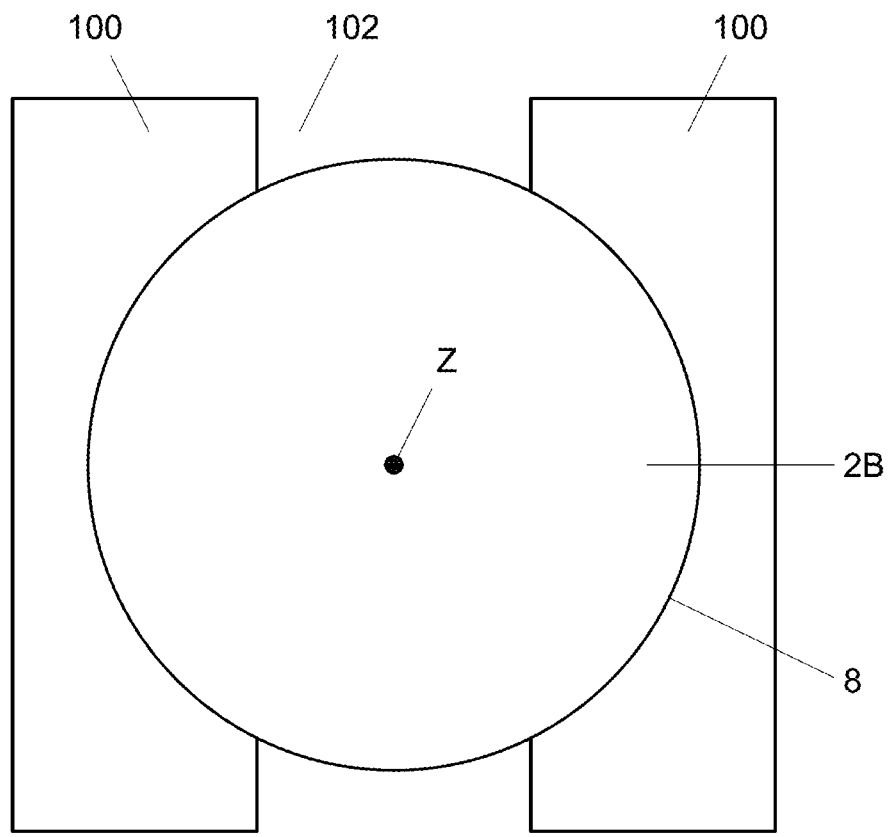
Fig. 7.2

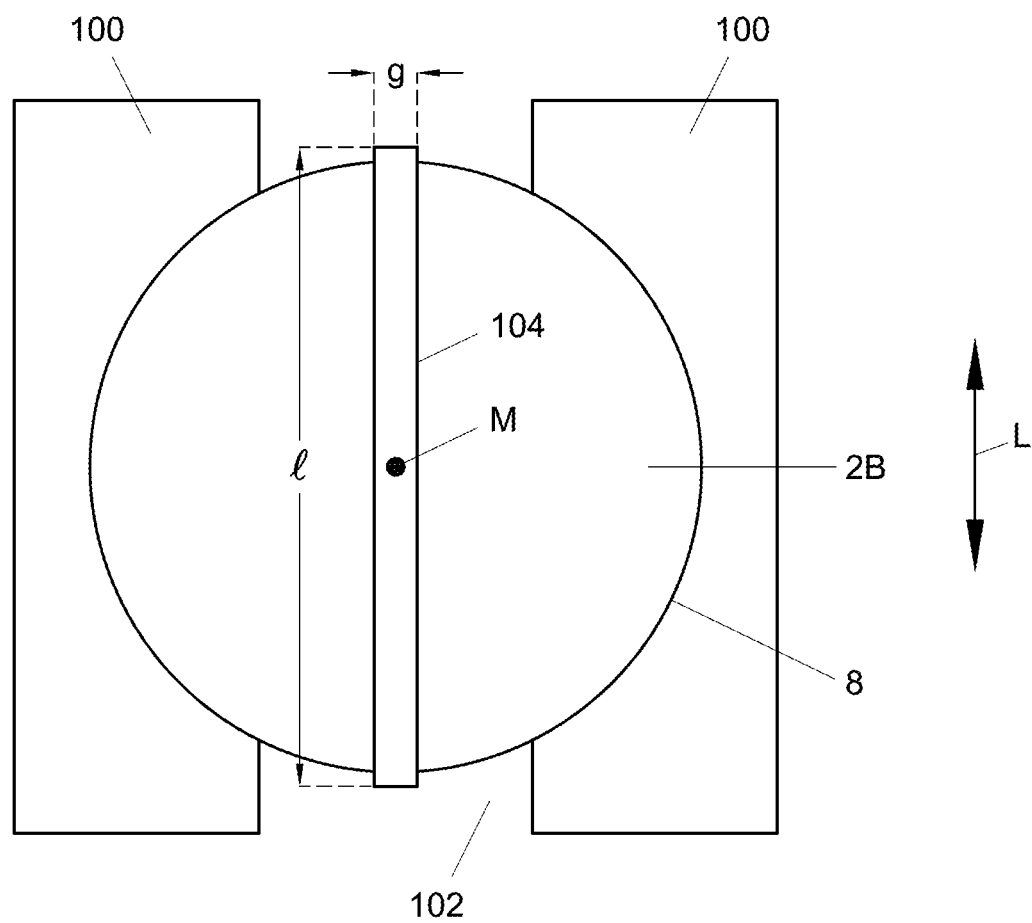
Fig. 7.3

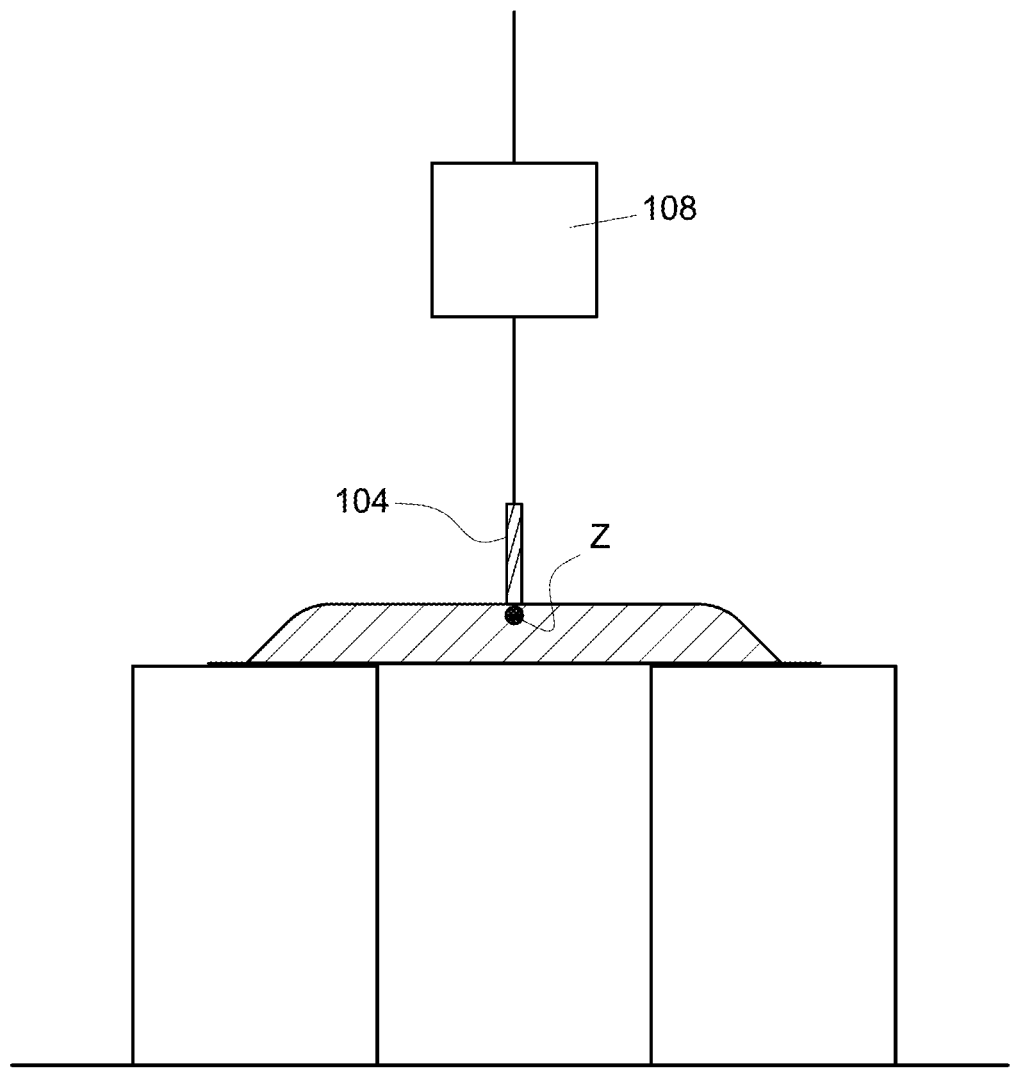
Fig. 7.4

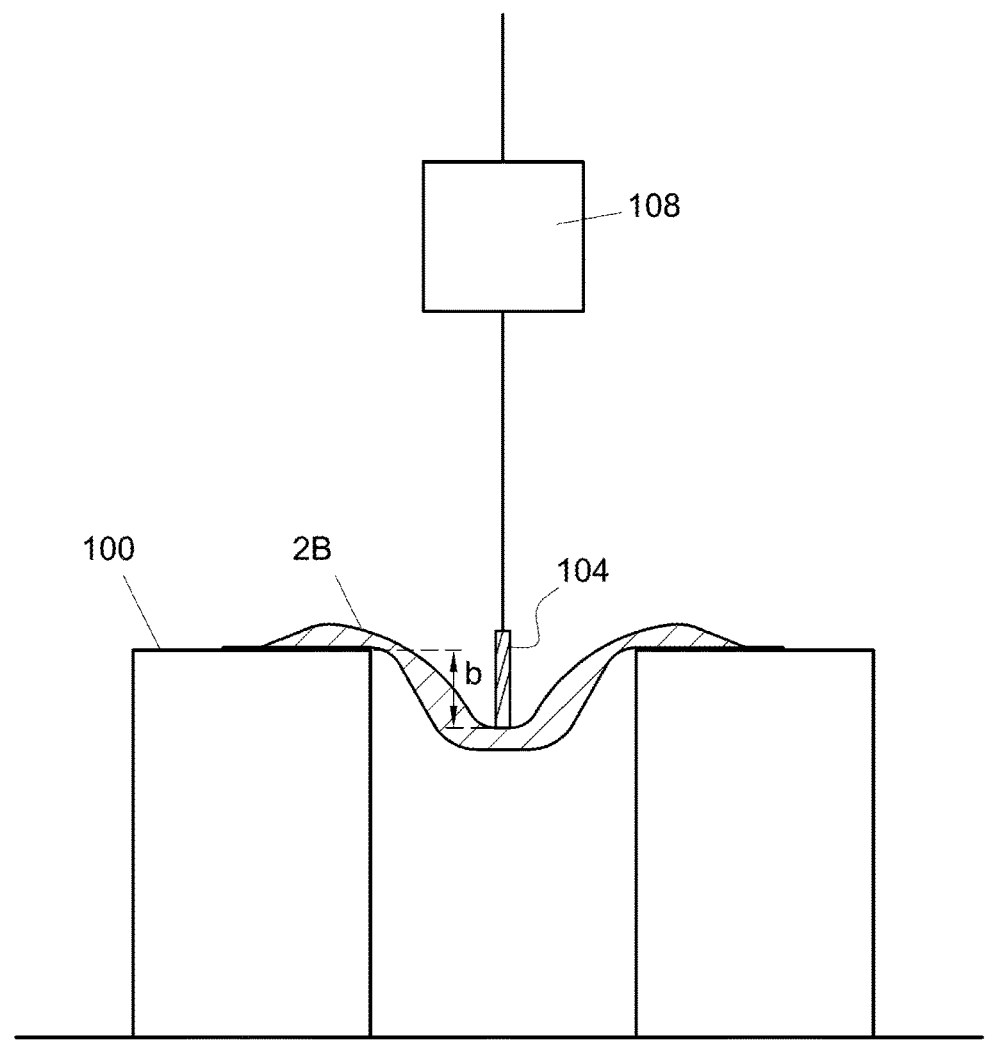
Fig. 7.5
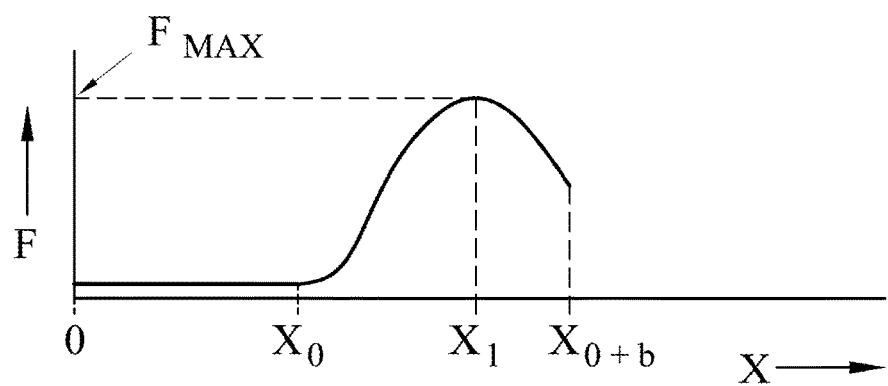
Fig. 7.6

PAD FOR USE IN A COFFEE MAKER

CROSS-REFERENCE TO RELATED APPLICATIONS

This Application is a continuation of International Patent Application No. PCT/NL2013/050510, filed on Jul. 5, 2013, which claims the benefit of priority to Netherlands Application No. NL2009133, filed on Jul. 5, 2012, all of which are hereby incorporated herein by reference in their entireties.

SUMMARY

The invention relates to a pad for use in a coffee-maker for preparing 1 or 2 cups of beverage, provided with an envelope with an inner space which is filled with a beverage preparation product for preparing the beverage, wherein the beverage preparation product comprises a product to be extracted with a fluid and/or possibly a product soluble in a fluid, wherein the envelope is formed by a first disc-shaped sheet and a second disc-shaped sheet which are interconnected adjacent their longitudinal edges, wherein the interconnected parts of the first sheet and the second sheet form a sealing seam and wherein the first sheet and the second sheet each form a filter which can pass the fluid and which forms a barrier to the beverage preparation product, wherein, in use, with the coffee-maker a fluid such as water is supplied, under pressure, to the pad so that the fluid is pressed through the pad for obtaining a beverage which thereupon leaves the pad. The invention further relates to a method for manufacturing such a pad.

The invention furthermore relates to a system provided with a coffee-maker and such a pad, wherein the coffee-maker is provided with a holder for receiving the pad, a cover for closing off the holder, and fluid means for generating a fluid flow under pressure, wherein the holder is provided with at least one beverage outflow opening and the cover is provided with at least one fluid inflow opening which are in fluid communication with the fluid means for supplying the fluid flow to the fluid inflow openings so that the fluid is supplied under pressure to the first sheet of the pad so that the fluid is pressed through the pad for the preparation of the beverage in the pad, wherein the beverage leaves the pad via the second sheet to proceed to leave the holder via the at least one beverage outflow opening. Also, the invention relates to the use of such a pad and a method for preparing a beverage with the pad. Such a pad, such a system and such a use and method are known per se from EP 0 904 717 A1. In EP 0 904 717 A1 the beverage preparation product consists of ground coffee. Furthermore, the first sheet and the second sheet are each made of filtering paper. The invention contemplates the provision of an improved pad.

According to the invention, it holds that the second sheet is of form-retaining design. The invention is based on the insight that the known pad, when it has been placed in a holder of the coffee-maker by a user, may sometimes be slightly deformed. This can happen because the known pad is of flexible and supple design and, for instance, may be taken from its package in slightly deformed condition. If the known pad has been placed in the holder, a user should take care that the pad in the holder has its original shape so that the second sheet of the pad extends over a bottom of the holder up to the upstanding sidewall of the holder. If he doesn't, the risk of bypass is increased. Bypass means that the fluid being supplied under pressure to the first sheet of the pad will flow in part around the pad to a beverage outflow opening which is provided in a bottom of the holder on which the pad rests. All this has as a consequence that not the complete amount of fluid being supplied to the first sheet of the pad will flow to the beverage outflow opening of the holder via the pad. A consequence is that the beverage which is received in, for example, a cup, is diluted with the fluid. The invention contemplates facilitating the use of a pad. As according to the invention the second sheet is of form-retaining design, the pad can be placed in the holder without relevant deformation which increases the risk of bypass. Moreover, it appears that owing to the second sheet being form-retaining, a distribution of the beverage preparation product in the envelope of the pad varies little from one pad to another. This in turn has as an advantage that upon forcing the fluid through the pad a beverage is obtained whose properties are well-defined in advance. In fact, if the distribution of the beverage preparation product were not uniform, but, for instance, at a particular position inside of the pad a relatively thin layer were formed between the first sheet and the second sheet, then at this position a reduced flow resistance to the fluid will occur. As the fluid being forced through the pad will choose the path of least resistance, the fluid will preferentially flow through the pad precisely in this area, with the result that fewer ingredients of the beverage preparation product will be incorporated in the finished beverage than if the thickness of the layer of the beverage preparation product extending between the first and second sheet were more uniform. Also, it appears in many variants of the form-retaining pad according to the invention that an anti-drip effect occurs. That is, directly after use the pad can be taken from a machine while the chance that drops fall off the pad has been reduced.

Preferably, it holds that the second sheet also remains form-retaining when a fluid such as the beverage is flowing through it, while the fluid can have a temperature of at most 80 degrees Celsius, more particularly at most 90 degrees Celsius, and preferably at most 99 degrees Celsius. This has as a consequence that also after use, hence after the pad has been subject to flow-through of fluid that will generally have a high temperature, when, for example, coffee or tea is being prepared, it will still be form-retaining. If the second sheet after use is still form-retaining, the pad can more easily be removed from the holder by the user in that the user has a better grip of the pad. Preferably, it holds, to this end, that the second sheet is made of a thermoplastic material. A thermoplastic material is a material that becomes more plastic as the temperature rises. Preferably, it holds then that the second sheet also remains form-retaining when it comes into contact with a fluid having a temperature of 80 degrees Celsius, more particularly of 90 degrees Celsius and preferably of 99 degrees Celsius.

In particular, it holds that the second sheet is made of a nonwoven material. In order for the second sheet to be form-retaining, it holds here in particular that the nonwoven material consists of a plastic for at least 50-70 percent by weight, excluding 70 percent by weight or for at least 70 percent by weight, while in particular the plastic consists of plastic fibers and/or plastic filaments. To put it differently, in order for the second sheet to be form-retaining, it holds here on balance, in particular, that the nonwoven material consists of a plastic for at least 50 percent by weight, while in particular the plastic consists of plastic fibers and/or plastic filaments.

More particularly, it holds here that the nonwoven material consists of a plastic for at least 60-70 percent by weight, excluding 70 percent by weight, or for at least 70 percent by weight, while in particular the plastic consists of plastic fibers and/or plastic filaments. Stated differently, in order for the second sheet to be form-retaining, it holds here on balance, more in particular, that the nonwoven material consists of a plastic for at least 60 percent by weight, while in particular the plastic consists of plastic fibers and/or plastic filaments.

More preferably, it holds that the nonwoven material consists of a plastic for at least 70 percent by weight, preferably for at least 80 percent by weight, and more preferably for at least 90 percent by weight. The nonwoven material can here be present in a form of fibers and/or in a form of filaments.

Preferably, it holds that the second sheet consists of a plastic for 50-70 percent by weight excluding 70 percent by weight or for 70-100 percent by weight. On balance it holds therefore that preferably the second sheet consists of a plastic for 50-100 percent by weight. Here it holds in particular that the plastic consists of plastic fibers and/or plastic filaments.

More preferably, it holds that the second sheet consists of a plastic for 60-70 percent by weight excluding 70 percent by weight or for 70-100 percent by weight. On balance it holds therefore that more preferably the second sheet consists of a plastic for 60-100 percent by weight. Here it holds in particular that the plastic consists of plastic fibers and/or plastic filaments.

Still more preferably, it holds that the second sheet consists of a plastic for 70-100 percent by weight, in particular consists of plastic for 75-95 percent by weight and more in particular consists of plastic for 80-95 percent by weight. Here it holds in particular that the plastic consists of plastic fibers and/or plastic filaments.

An advantage of a nonwoven material is that it can form a good fluid sealing with the holder when the nonwoven material is moist as a result of the supply of the fluid. When the nonwoven material is made of a plastic at least for a part, it may typically have been made form-retaining through a heat treatment. The plastic can consist, for example, of polymers which comprise PE, PET, PETP, coPET, LLDPE, CPP, PLA and/or PP. The plastic is present in the nonwoven material in the form of, for instance, plastic fibers and/or plastic filaments.

In particular, it holds that the second sheet is furthermore provided with cellulose fibers and/or cellulose filaments. Still more in particular, the second sheet consists of the above-mentioned plastic fibers and/or plastic filaments and the cellulose fibers and/or cellulose filaments. The nonwoven material can thus consist of a combination of plastic fibers and/or plastic filaments and cellulose fibers and/or cellulose filaments. Also, it may be that the cellulose fibers are covered with a plastic coating. An advantage of the embodiments mentioned is that the second sheet has the optical properties of filtering paper more, while yet being form-retaining. This last may be so because, measured in percents by weight, more plastic or plastic fibers and/or plastic filaments are present than cellulose fibers and/or cellulose filaments, while, in particular, the nonwoven material has undergone a heat treatment to increase form retention.

According to a practical embodiment, it holds that the density of the second sheet is in the range of 15-60 g/m2 or in the range of 60-200 g/m2 excluding 60 g/m2, preferably 70-150 g/m2 and more preferably 90-120 g/m2. At these densities, the form retention concerned can be realized well. In particular, it holds that the second sheet is made of a polyester fiber, in particular of Smash™ material. Preferably, it holds that the second sheet is made of SMASH™ 150 g/m2.

In particular, it holds alternatively that the second sheet is made of Polylactic Acid (PLA) fibers. Preferably, it holds that the second sheet is made of PLA 70-100 g/m2.

Also, it holds preferably that the second material is made of 100% Polylactic Acid (PLA) fibers and possibly derivatives. Owing to this, the second sheet is at least substantially completely biodegradable after use.

In this application, a form retention can for instance be defined as follows. The form retention of the second sheet according to a test is expressed in a force, measured during the test, that is exerted on the second sheet, while the test is carried out on the second sheet as such, that is, on the pad without the first sheet and the beverage preparation product but with preservation of its shape such as when the second sheet forms part of the pad. For carrying out the test, the second sheet as such, that is, the pad without the first sheet and the beverage preparation product, is laid on a horizontal surface, such that the second sheet is supported by its longitudinal edge on the horizontal surface, the horizontal surface provided with an elongated groove having a width of 30 mm and the second sheet, symmetrically with respect to the groove, overlying the groove and supported on opposite sides of the groove on the horizontal surface, while in carrying out the test use is made of a knife having a length corresponding to the diameter of the pad, a cutting face of the knife having a thickness of 3 mm and a length direction of the cutting face extending in horizontal direction in a length direction of the groove, wherein for testing, the knife from a position above the pad is moved down in vertical direction with a constant speed of 100 mm/minute, a center of the cutting face situated, viewed in vertical direction, above a center of gravity of the second sheet, and wherein from the moment that the knife touches the second sheet the resistance in units Newton is measured that the knife experiences as a result of the deforming of the pad by the knife as the knife moves down and wherein the moving down is continued until the cutting face of the knife is in the groove at a 12 mm depth with respect to the horizontal surface and wherein a measured highest resistance is the measure of the bending stiffness of the second sheet.

According to a preferred embodiment of the pad, the highest resistance measured according to the test, that is, the highest measured force in Newton, is in the range of 0.2-4 Newton, and/or the highest measured force in the test is greater than 1 Newton.

In this application the thickness of a sheet is defined according to NEN-EN-ISO 53-2011.

In addition, it can be effected that the thickness of the second sheet is in the range of 50-400 or 400-500 micrometer (μm) excluding 400 micrometer, hence on balance in the range of 50-500 micrometer, preferably in the range of 100-500 micrometer, preferably in the range of 110-350 micrometer, more preferably in the range of 150-300 micrometer. What is thus effected is on the one hand that the second sheet is not too heavy and on the other hand also that the second sheet is well permeable to the fluid. In particular, it holds here that when the fluid is being caused to flow through the pad, a pressure drop across the beverage preparation product is greater than a pressure drop across the second sheet, in particular 10 times greater, more particularly 20 times greater. The thickness of the first sheet can be, for example, 1.4-10 times smaller than the thickness of the second sheet.

Furthermore, it holds preferably that the first sheet is of flexible design. The first sheet may be made of filtering paper known per se. In particular, it holds that the first sheet is provided with at least 70% of cellulose fibers and/or cellulose filaments, more preferably with at least 80% of cellulose fibers and/or cellulose filaments, still more preferably with at least 90% of cellulose fibers and/or cellulose filaments, while possibly for the rest the first sheet is made of plastic polymers of a kind as mentioned above, in particular in the form of plastic fibers and/or plastic filaments. The first sheet preferably comprises less than 30 percent of plastic polymers. The first sheet may also be made from PLA for 100%. Also, the first sheet can consist of PLA and Paper, for example, 25% PLA and 75% Paper. These polymers may be of a same kind as has been discussed for the second sheet. It is also possible, however, that the first sheet is of form-retaining design and is preferably made of a same material as the second sheet.

More particularly, it holds here that the first sheet and the second sheet are manufactured from a same sheet or same sheets. If the first sheet and the second sheet have undergone a heat treatment for making the sheet form-retaining, in that case, preferably, the heat treatment will also be the same, so that the first sheet and the second sheet have the same properties.

In particular, it holds that the part of the second sheet that is situated within the contours of the sealing seam is of dish-shaped design, while, in particular, the first sheet is of flat design. This has as an advantage that the coffee pad is self-locating when it is placed in a holder having a shape corresponding to the pad. The intention is then for the second sheet to come to rest on the bottom of such a holder.

The system according to the invention is, to that end, provided with a coffee-maker which is provided with a holder for receiving the pad, a cover for closing off the holder, and fluid means for generating a fluid flow under pressure, wherein the holder is provided with at least one beverage outflow opening and the cover is provided with at least one fluid inflow opening which are in fluid communication with the fluid means for supplying the fluid flow to the fluid openings so that the fluid is supplied under pressure to the first sheet of the pad so that the fluid is pressed through the pad for the preparation of the beverage in the pad, the beverage leaving the pad via the second sheet to proceed to leave the holder via the at least one beverage outflow opening.

Preferably, it holds here that the holder is provided with a bowl-shaped inner space, which is bounded by the bottom and an upstanding sidewall of the holder, wherein the bottom consists of an outer horizontally directed ring-shaped bottom part which adjoins the sidewall and an inner dish-shaped bottom part, wherein the dish-shaped bottom part adjacent the ring-shaped bottom part slopes downwards in a direction directed away from the sidewall and wherein the at least one outflow opening is provided in the dish-shaped bottom part. As mentioned, the pad rests on the bottom, while the second sheet extends along the bottom to near the upstanding edge. Preferably, the sealing seam of the pad then rests on the ring-shaped bottom part. In particular, it holds here that in the dish-shaped bottom part grooves are provided which form a fluid path to the at least one beverage outflow opening, while the grooves extend exclusively under the beverage preparation product in the pad. The portion of the bottom that is not provided with grooves, more particularly the ring-shaped bottom part, can then form a fluid sealing with that portion of the second sheet that rests on said areas of the bottom when the pad becomes moist through the fluid.

In particular, it holds that the at least one outflow opening is provided with a nozzle for generating a jet of the beverage. With the aid of the jet, in a manner known per se, air can be beaten into the prepared beverage for obtaining a beverage with a fine-bubble foam layer when it has been received in, for example, a cup. To this end, the system may for instance be provided with an impact surface impacted by the jet for beating air into the beverage to obtain a beverage with a fine-bubble foam layer.

In particular, it holds that the fluid is supplied to the first sheet with a pressure of 0.9 to 1.5 bar above atmospheric pressure. At this relatively low pressure, still a beverage with a good fine-bubble foam layer can be obtained that is comparable to beverages that are prepared under high pressure, as is the case with a coffee bed through which hot water is caused to flow under a pressure in excess of 10 bar.

The pad according to the invention is filled with a beverage preparation product for preparing beverage, the beverage preparation product comprising a product to be extracted with a fluid (and/or a product soluble in a fluid). The product to be extracted with a fluid can consist of, for example, ground coffee or tea-leaves. A product soluble in a fluid can consist of, for example, milk powder, chocolate milk powder and the like.

According to a particular embodiment of the system according to the invention, the system is further provided with a known coffee pad (such as a prior art coffee pad as defined in EP 904 717 A1) provided with an inner space which is filled with ground coffee, wherein the inner space is formed by a top sheet and a bottom sheet which are interconnected adjacent their longitudinal edges, wherein the top sheet and the bottom sheet also form an outer side of the pad and are each made of flexible filtering paper and wherein the coffee pad and the holder are tailored to each other so that the coffee pad can be received in the holder for preparing coffee, such that, in use, the fluid is supplied under pressure to the top side of the pad and is pressed through the pad so that the fluid flows through the top sheet, whereby in the pad a coffee extract is formed which proceeds to leave the pad via the bottom sheet and wherein the coffee extract proceeds to flow out of the holder via the beverage outflow opening of the holder. With such a system, a user can therefore use, as desired, the known coffee pad and the pad with the form-retaining second sheet in one and the same coffee-maker.

BRIEF DESCRIPTION OF THE DRAWINGS

The invention will now be further elucidated with reference to the drawings, in which:

FIG. 7.1 shows a side elevational view of an apparatus for determining a form retention of a second sheet of a pad;

FIG. 7.2 shows a view according to 7.2 of FIG. 7.1;

FIG. 7.3 shows a view according to 7.3 of FIG. 7.1;

FIG. 7.4 shows a side elevational view similar to FIG. 7.1 at the moment that a knife is just beginning to touch the pad;

FIG. 7.5 shows a side elevational view similar to FIG. 7.1 when the knife has reached a lowest position; and FIG. 7.6 shows a curve of a measured force during the test.

DETAILED DESCRIPTION

Figure 1:
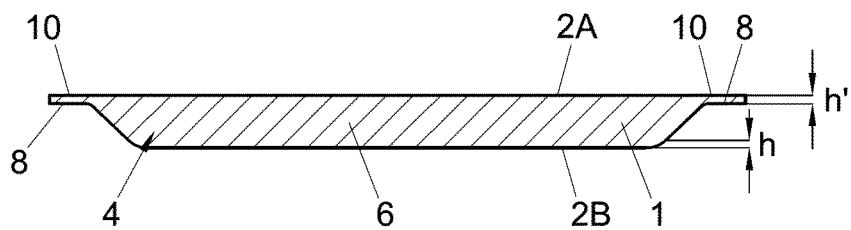
FIG. 1 shows a possible embodiment of a pad according to the invention.

In FIG. 1, with reference numeral 1 a pad for use in a coffee-maker is shown. The pad is of a type intended for preparing one or two cups of beverage. A cup of beverage can consist, for instance, of 20-200 ml of beverage, more particularly of 20-180 ml of beverage. The pad 1 is provided with an envelope 2A, 2B with an inner space 4 which is filled with a beverage preparation product 6 which is shown in hatched representation in the drawing. In this example, it holds that the envelope bounds the inner space. The beverage preparation product is intended for preparing a beverage. To this end, the beverage preparation product comprises a product to be extracted with a fluid and/or possibly a product soluble in a fluid.

In this example, it holds that the beverage preparation product comprises exclusively a product to be extracted with a fluid, more particularly, this concerns ground coffee. The envelope is formed by a first disc-shaped sheet 2A and a second disc-shaped sheet 2B which are interconnected adjacent their longitudinal edges 8. The interconnected parts of the first sheet 2A and the second sheet 2B form a sealing seam 10. The sealing seam therefore has the shape of a ring. The first sheet and the second sheet each form a filter which can pass a fluid and which forms a barrier to the beverage preparation product. This makes it possible that, in use, with a coffee-maker a fluid such as water is supplied under pressure to the pad so that the fluid is pressed through the pad for obtaining a beverage which thereupon leaves the pad again. All this will be discussed in more detail with reference to FIG. 2.

In this example, it holds furthermore that the second sheet 2B is of form-retaining design. The form retention of the second sheet, according to a test, is expressed in a force, measured during the test, which is exerted on the second sheet, while the test is carried out on the second sheet as such, that is, on the pad without the first sheet and the beverage preparation product; see FIGS. 7.1-7.3.

For carrying out the test, the second sheet 2B as such, that is, the pad without the first sheet and the beverage preparation product, but with preservation of its shape such as when the second sheet forms part of the pad, is laid on a horizontal surface 100, such that the second sheet is supported by its longitudinal edge 8 on the horizontal surface, while the horizontal surface is provided with an elongated groove 102 which has a width a of 30 mm, and while the second sheet, symmetrically with respect to the groove, overlies the groove and on opposite sides of the groove is supported on the horizontal surface. In carrying out the test use is made of a knife 104 having a length/which corresponds to the diameter D of the pad. A cutting face 106 of the knife has a thickness of 3 mm. A length direction L of the cutting face 106 extends in horizontal direction in a length direction L of the groove. For testing, the knife, from a position above the pad, is moved down in vertical direction V with a constant speed v of 100 mm/minute, while a center M of the cutting face is situated, viewed in vertical direction, above a center of gravity Z of the second sheet. Because the second sheet has the shape of a disc with a center P, this center P corresponds to the center of gravity mentioned. Moving the knife down is carried out with a load cell 108. Prior to carrying out the test, the longitudinal edge 8 lies wholly fittingly against the surface 100. From the moment that the knife touches the second sheet (FIG. 7.4) the resistance in units Newton is measured that the knife experiences as a result of the deforming of the pad by the knife as the knife moves down. In other words, the force is measured that the knife experiences from the second sheet as the knife moves down. Before the knife touches the second sheet, this force is zero. Thereupon this force starts to run up. Moving down is continued until the cutting face of the knife is in the groove at 12 mm depth b with respect to the horizontal surface (see FIG. 7.5). A highest resistance or force measured with the load cell 108 is the measure of the bending stiffness of the second sheet. This highest resistance Fmax is measured in Newton. As the knife moves down and initially touches the second sheet, the second sheet will first deform elastically. Thereafter, upon further downward movement, the second sheet is deformed. The measured greatest force typically corresponds with the moment just before which the second sheet buckles and hence yields under the load of the knife. After buckling the force can decrease again.

In other words, the force is measured that the knife experiences as a result of the pad deforming. In FIG. 7.6 this force F is plotted as a function of the distance x over which the knife is moved down. From x=x0 the force F starts to rise from F=0. The maximum measured force Fmax is at x=x1. At x=x0+b the knife has reached the point of its maximum downward travel. The measured measure for the form retention of the second sheet is F max.

The measured greatest force is preferably in the range of 0.2-4 Newton, and/or is preferably greater than 1 Newton.

In particular, it holds that the second sheet also remains form-retaining when a fluid such as the beverage and/or water is caused to flow through it, while the fluid can have a temperature of at most 80 degrees Celsius. In other words, when the fluid has a temperature that can run up to 80 degrees Celsius, the second sheet keeps the form-retaining properties mentioned.

More particularly, it holds here that the second sheet remains form-retaining when a fluid is caused to flow through it, while the fluid can have a temperature of at most 90 degrees Celsius and preferably at most 99 degrees Celsius.

In this example, it holds that the second sheet is made of a thermoplastic material. A thermoplastic material is a material that becomes more plastic as the temperature rises. Accordingly, it holds in this example that the second sheet also remains form-retaining when it comes into contact with a fluid such as a beverage and/or hot water that has a temperature of 80 degrees Celsius. Because a thermoplastic material is involved here, it will also hold that the sheet remains form-retaining when it comes into contact with a fluid having a temperature that is lower than 80 degrees Celsius.

More particularly, it holds that the second sheet also remains form-retaining when it comes into contact with a fluid of 90 degrees Celsius and preferably of 99 degrees Celsius. What is involved then, as mentioned, is a second sheet that is made of a thermoplastic material.

In this example, it holds furthermore that the second sheet is made of a nonwoven material. This nonwoven material, in this example, is made of a plastic for at least 50 percent by weight and preferably for at least 60 percent by weight, while in particular the plastic consists of plastic fibers and/or plastic filaments. More preferably, it holds that the nonwoven material is made from a plastic for at least 70 percent by weight. In particular, it holds that the nonwoven material consists of the plastic for at least 80 percent by weight, and more preferably for at least 90 percent by weight. On the other hand, it holds preferably that the nonwoven material consists of a plastic for 50-100 percent by weight, more preferably for 60-100 percent by weight. Still more preferably, it holds that the nonwoven material consists of the plastic for 70-100 percent by weight, in particular consists of a plastic for 75-95 percent by weight and still more in particular consists of plastic for 80-95 percent by weight.

In this example, it holds furthermore that the plastic comprises polymers of PLA, PETP and/or LLDPE. More in general, it holds that plastics and combinations thereof are possible such as PE, PET, PETP, coPET, LLDPE, CPP, PLA and/or PP.

In this example it holds that the nonwoven material has been made form-retaining through a heat treatment. This means that the sheet-form material that has been made of the respective plastic is brought into the required shape such as it is shown for the second sheet 2B, after which the second sheet undergoes a heat treatment so that the second sheet after cooling becomes form-retaining. In this example, it holds furthermore that the second sheet is provided with cellulose fibers and/or cellulose filaments. Accordingly, in that case, the second sheet comprises a combination of the above-mentioned plastics and cellulose fibers and/or filaments. In this example, it holds furthermore that the nonwoven material is provided with the cellulose fibers and/or the cellulose filaments. If this nonwoven material, as discussed above, consists of the plastic mentioned for at least 50 percent by weight, it will hold that the nonwoven material furthermore consists of cellulose for at most 50 percent by weight. If this nonwoven material, as discussed above, consists of the above-mentioned plastic for at least 60 or at least 70 percent by weight, it will hold that the nonwoven material furthermore consists of cellulose for at most 40 or 30 percent by weight, respectively. The nonwoven material therefore comprises preferably a combination of plastic and cellulose fibers and/or filaments. The plastic, according to the invention, preferably consists of plastic fibers and/or filaments. In this example, these plastic fibers and/or plastic filaments are part of the nonwoven material. It is also possible, however, that the plastic is present in the second sheet in the form of a coating on the cellulose fibers and/or the cellulose filaments. In this example, these plastic-coated fibers and/or plastic-coated filaments are then part of the nonwoven material.

Figure 4:
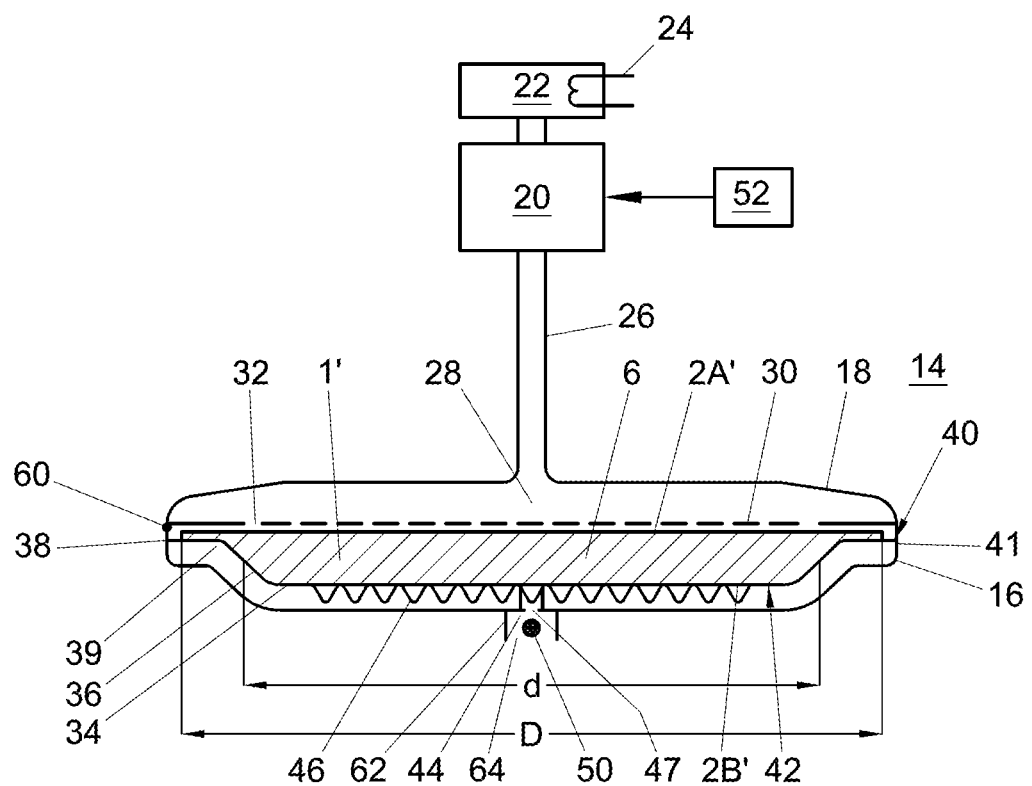
FIG. 4 shows an embodiment of the system according to FIG. 2 which is further provided with a flexible pad of filtering paper.

From the examples mentioned it appears that it holds in particular that the nonwoven material consists for a greater proportion of percents by weight of the plastic mentioned than of cellulose fibers and/or filaments. In this example, it holds that the density of the second sheet is in the range of 15-60 g/m2 or in the range of 60-150 g/m2 excluding 60 g/m2, that is, on balance in the range of 15-150 g/m2. Preferably, however, it holds that the density of the second sheet is in the range of 70-130 g/m2, more preferably in the range of 90-120 g/m2. The thickness of the second sheet in this example is in the range of 50-600 micrometer. Preferably, it holds that the thickness is in the range of 100-500 micrometer, more particularly in the range of 150-300 micrometer. The thickness mentioned is schematically denoted in FIG. 1 and in FIG. 4A with the letter h.

In this example, it holds furthermore that the second sheet within the contours of the sealing seam is designed to be homogeneously permeable to a fluid such as water. Also, it holds in this example that the second sheet within the contours of the sealing seam comprises a smoothly running inner and outer surface.

In this example, it holds furthermore that the first sheet is of flexible design. In particular, it holds that the first sheet is made of filtering paper known per se. Here, it holds in this example that the first sheet is provided with at least 70 percent of cellulose fibers and/or cellulose filaments. The residual portion of the first sheet may again be made of the plastics and/or plastic fibers and/or plastic filaments and/or plastic coatings mentioned in the context of the second sheet. More particularly, it holds that the first sheet is provided with at least 80 percent by weight of cellulose, more preferably with at least 90 percent by weight of cellulose. The first sheet comprises less than 30 percent by weight of plastic polymers, preferably of a same kind as mentioned in the context of the second sheet.

The thickness of the first sheet is, for example, 1.4-10 times smaller than the thickness of the second sheet. The thickness mentioned is schematically denoted in FIG. 1 with the letter h'.

Figure 2:
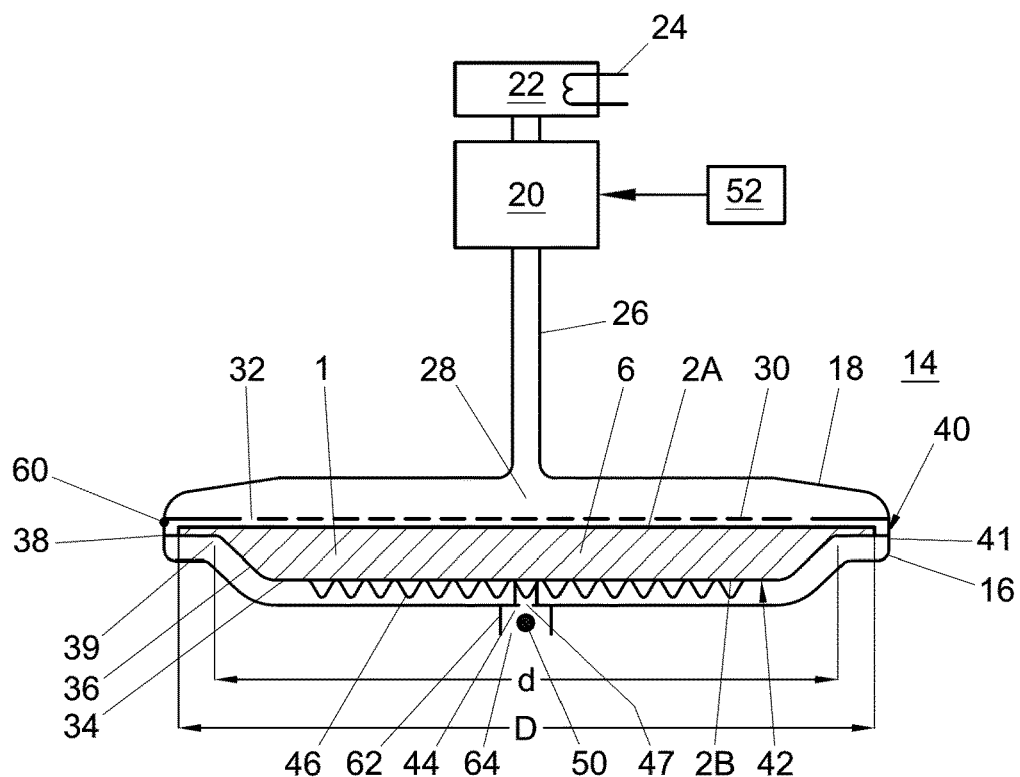
FIG. 2 shows an embodiment of a system according to the invention which is provided with the pad according to FIG. 1 and a coffee-maker.
Figure 3:
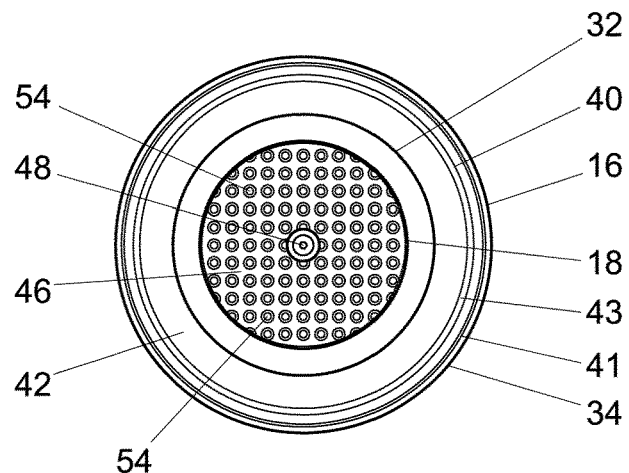
FIG. 3 shows a top plan view of a holder of the coffee-maker according to FIG. 2.

As can be seen in FIG. 1, it holds that the part of the second sheet that is within the contours of the sealing seam is of dish-shaped design. Also, it holds in this example that the first sheet is of flat design. The part of the second sheet that is within the contours of the sealing seam, as shown in FIG. 2, has a diameter denoted with d. The diameter of the whole pad is denoted with D in FIG. 2. Also, this means that the ring-shaped sealing seam 10 has a diameter of (D–d)/2. In this example, D is approximately 74.4 mm and d is approximately 61 mm. Other dimensions are conceivable for D. D can be, for instance, in the range of 45-90 mm, preferably 70-80 mm, more preferably 73-76 mm, in particular approximately 74.4 mm.

According to an alternative, the second sheet can comprise a foil and/or consist of a foil which is provided with a multiplicity of outflow openings and is made of a plastic, comprising plastic polymers. The plastic polymers can comprise PE, PET, PETP, coPET, LLDPE, CPP, PLA and/or PP. The second sheet can then comprise a first layer which consists at least substantially of PETP and a second layer which consists at least substantially of CPP.

In FIG. 2 a system is shown in which the pad of FIG. 1 is used. The system is provided with a coffee-maker 14 which is provided with a holder 16 for receiving the pad 1. Further, the coffee-maker is provided with a cover 18 for closing off the holder 16. The coffee-maker is furthermore provided with fluid means 20, 22 for generating a fluid flow under pressure. In this example, these fluid means consist of a pump 20 and a storage vessel 22 which is filled with a fluid, in this example with hot water. The temperature of the water can be, for example, 70-98 degrees Celsius. To that end, the storage vessel 22 is provided with a heating element 24. The storage vessel 22 itself in turn may be filled from a larger storage vessel, which comprises cold water. This larger storage vessel is not shown in the drawing. The pump 20, in use, supplies hot water via a duct 26 to an inner space 28 of the cover 18. A bottom 30 of the cover is provided with a multiplicity of inflow openings 32. The holder 16 is provided with a bowl-shaped inner space 36 which is bounded by a bottom 34 of the holder and an upstanding sidewall 38 of the holder. The bottom consists of an outer horizontally directed ring-shaped bottom part 40 which adjoins the sidewall 38. Furthermore, the bottom comprises an inner dish-shaped bottom part 42, while the dish-shaped bottom part adjacent the ring-shaped bottom part slopes downwards in a direction directed away from the sidewall, to the inside of the holder. The ring-shaped bottom part is provided with an outer edge 41 which adjoins the sidewall 38 and an inner edge 43 which adjoins the dish-shaped bottom part 42. The bottom is provided with at least one outflow opening 44. This outflow opening in this example is located in the dish-shaped bottom part 42. As shown in FIG. 2, it holds that the pad 1 rests on the bottom 34, with the second sheet extending along the bottom to near the upstanding sidewall 38. The sealing seam 10 of the pad then rests on the ring-shaped bottom part 40. As can be seen, the second sheet has a shape that corresponds to the shape of the bottom of the holder. The second sheet here has a smoothly running inner and outer surface within the sealing seam. In this example, it holds furthermore that in the dish-shaped bottom part 42 grooves 46 are provided. The grooves extend exclusively under the beverage preparation product 6 in the pad. In this example, it holds that the grooves 46 are formed by a multiplicity of projections 54 of the bottom. Between the upstanding projections 54, the respective grooves are formed. According to the invention, the grooves may also be differently formed, for instance as slots provided in the bottom and extending, for instance, in radial direction towards the outflow opening 44. The bottom is at least partly of smooth design and is made of a plastic and/or metal. The upper side of the tops are smooth, just like the rest of the bottom. In this example, it holds that the beverage preparation product is ground coffee. As can be properly seen, the ground coffee 6 forms a coffee bed. The grooves are under the coffee bed but also within the contours of the coffee bed, i.e., within the contours of the positions where the beverage preparation product is situated in the pad. The dish-shaped bottom part comprises an inner flat bottom part which is denoted with d' in FIG. 2. As can be seen, the grooves extend exclusively in this inner bottom part d' which is flat. Further, it holds that the at least one outflow opening 44 is provided with a nozzle 46 for generating a jet of the beverage as will be further elucidated hereinafter. To this end, the system is further provided with an impact member 50 which, in use, is impacted by a jet of the beverage made. The working of the system described up to this point is as follows.

A user will first of all remove the cover 18 for placing the pad 1 of FIG. 1 in the holder 16 of FIG. 2. Because the pad is provided with the second sheet 2B which is form-retaining, the pad will of itself slide into the right position as the pad is positioned in the bottom. The pad is, as it were, self-locating and ends up in the position as shown in FIG. 2. After this, the holder can be closed off with the cover as shown in FIG. 2. Thereupon a user operates the control unit 52 of the coffee-maker 14. The result is that the control unit 52 activates the pump 20. As a result, hot water is supplied from the storage vessel 22 via the duct 26 to the inner space 28 of the cover 18. This water will leave the cover 18 and flow into the holder via the inflow openings 32. The consequence is that the water is supplied under pressure from the upper side of the pad to the first sheet of the pad. The pressure in this example is 1.1 bar above atmospheric pressure. The hot water will then penetrate via the first sheet 2A into the inner space of the pad. Here, the hot water comes into contact with the ground coffee so that the coffee beverage is formed. The coffee beverage leaves the coffee pad via the second sheet 2B. As a result of the second sheet 2B becoming moist, it will form a sealing with the bottom 34, there where there are no grooves. There where the grooves are, the beverage will leave the pad. As a result of the grooves extending exclusively under the coffee bed, bypass is avoided. What is further avoided is that the hot water forms channels extending in vertical direction through the coffee bed. Such channels would preclude an optimal and efficient extraction of the ground coffee. Since, in addition, the grooves extend in a flat part of the bottom, this enables the second sheet to properly abut the bottom, so that it's the grooves that determine where the beverage can flow out of the pad. The beverage proceeds to flow via the grooves to the outflow opening 44. Because the outflow opening 44 is provided with a nozzle 47, while moreover it holds that the fluid is supplied to the pad under pressure, the coffee beverage will be formed into a jet that impacts the impact surface 50. As a result, the beverage will be atomized in a chamber 62 of the holder which is open at its underside 64. When the beverage is thereupon received in a cup, a beverage is obtained with a fine-bubble foam layer. After preparation of the beverage, the holder can be opened again by removing the cover. The pad 1 can then be removed easily in that the second sheet is still form-retaining.

In this example, it holds that the cover is provided with a sealing ring 60 which seals fluid-tightly against the upstanding sidewall 38 of the holder. It is also possible, however, that the upstanding sidewall 38 is provided with the sealing ring, this sealing ring then sealing against the cover 18. In this example, the second sheet is of form-retaining design. It is also possible, however, that the first sheet is also of form-retaining design. Preferably, it holds here that the first sheet is made of a same material as the second sheet. More particularly, it holds here that the first sheet and the second sheet are made from a same sheet or same sheets. In this example, the beverage preparation product consists of ground coffee. It is also conceivable, however, that the beverage preparation product consists of, for example, tea. (Furthermore, it is possible that the beverage preparation product consists of a product soluble in fluid or a product that forms a dispersion such as milk powder and/or cacao for preparing milk or chocolate milk.) It is also conceivable that the beverage preparation product is provided with one of the extractable products mentioned or a different type of extractable product in combination with a fluid-soluble product. The fluid-soluble product in turn may consist of milk powder or a flavor enhancer. Also, it is conceivable that the pad is used in a different type of coffee-maker. Further, in the holder of the coffee-maker of FIG. 2, also a coffee pad 1' according to FIG. 5 may be placed, which is provided with an inner space which is filled with ground coffee, while the inner space is formed by a top sheet 2A' and a bottom sheet 2B' which are interconnected adjacent their longitudinal edges, while the top sheet and the bottom sheet also form an outer side of the pad and are each made from flexible filtering paper. The coffee pad 1' and the holder 16 are tailored to each other so that the coffee pad can be received in the holder for preparing coffee, such that, in use, the fluid is supplied under pressure to the upper side of the pad and is pressed through the pad so that the fluid flows through the top sheet whereby in the pad a coffee extract is formed which proceeds to leave the pad via the bottom sheet and wherein the coffee extract proceeds to flow out of the holder via the beverage outflow opening of the holder. The bottom sheet of the pad here extends over the bottom 34 of the holder up to the upstanding sidewall 38 of the holder, thereby also forming a sealing with the holder to prevent bypass. The beverage can leave the pad there where the grooves are. Accordingly, the invention also concerns a system provided with the coffee-maker, the pad 1 and the pad 1', allowing a user, as desired, to use the pad 1 or the pad 1' for preparing the beverage.

FIGS. 5a-5f schematically show a method for making the pad as discussed above.

Figure 5A:
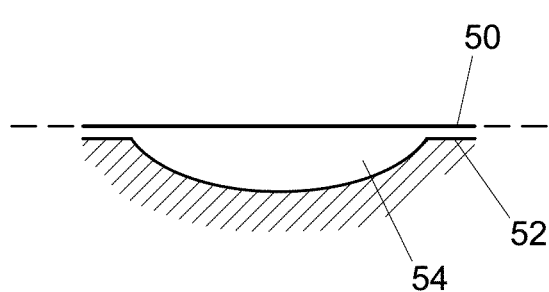
FIGS. 5a-5f show schematically a method for making the pad as discussed above.
Figure 5B:
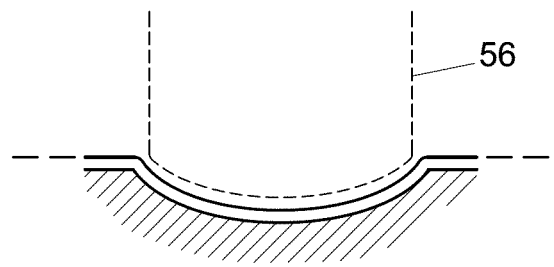
Figure 5C:
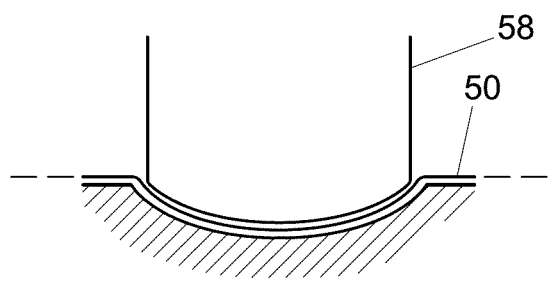
Figure 5D:
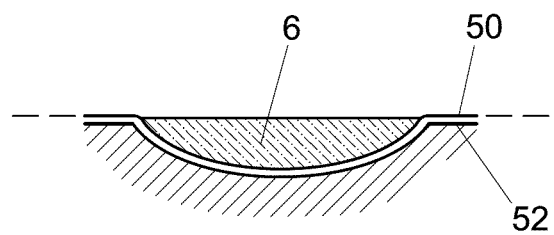
Figure 5E:
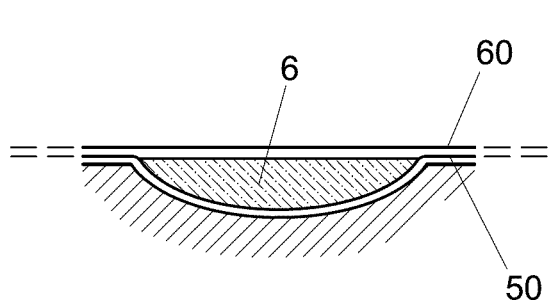
Figure 5F:
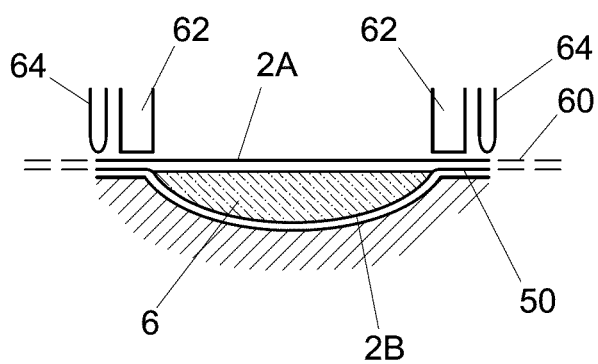

In FIG. 5a it is shown that a fourth sheet 50 is placed above a mold 52 made of metal. Through, for instance, vacuum suction of the mold cavity 54, the fourth sheet takes the shape of the mold cavity (FIG. 5b). Also, alternatively, the fourth sheet may be mechanically pressed into the mold cavity with a stamp 56 (represented in broken lines). Then, in FIG. 5c, the fourth sheet is heated with a stamp 58. The fourth sheet is heated to, for example, 200-400 degrees Celsius. (The fourth sheet may also be heated in step c. to a temperature of 90-200 degrees Celsius, in particular when the second sheet is made of PLA.) The plastics in the sheet will thereby liquefy and/or soften. After this, the stamp 58 is removed and the fourth sheet is cooled. The sheet has now become form-retaining. The second sheet in this example will now already have a smoothly running inner and outer surface within the sealing seam to be formed. Thereupon, the beverage preparation product 6 is positioned on the fourth sheet (FIG. 5d). Next, a third sheet 60 is placed above the fourth sheet 50 and the beverage preparation product. By means of a ring-shaped heating element 62, the fourth sheet and the third sheet are welded together (FIG. 5f), whereby the sealing seam 10 is formed. Next, with a ring-shaped die 64 the pad 1 is cut out. The cut-out part of the fourth sheet 50 then constitutes the second disc-shaped sheet 2B and the cut-out part of the third sheet 60 then constitutes the first disc-shaped sheet 2A. Accordingly, it holds that in a step a. a set-up of a third sheet, fourth sheet and the beverage preparation product is made, with the beverage preparation product situated between the third sheet and the fourth sheet (FIG. 5e), and then in a step b. the third sheet and the fourth sheet are joined together (FIG. 5f). Further, it holds that the fourth sheet is heated in a step c. (FIG. 5c) and then is cooled in a step d. for increasing the bending stiffness of the fourth sheet.

Further, it holds that the fourth sheet is heated in step c. to a temperature of 200-400 degrees Celsius or for instance 90-200 degrees Celsius. In a step e. the fourth sheet is placed in a mold so that the fourth sheet obtains a predetermined shape (FIG. 5b), while thereupon step c. (FIG. 5c) is carried out. In a step f. the beverage preparation product is placed on the fourth sheet, preferably while the fourth sheet is already in the mold (FIG. 5d), whereby step b. is carried out after step f. It also holds in this example that step c. (FIG. 5c) is carried out before step f. (FIG. 5d). The third sheet and/or the fourth sheet may during the execution of step b. be heated to 90-400 degrees Celsius, in particular 90-200 degrees Celsius. Also, it holds that the fourth sheet and possibly the third sheet is cooled after carrying out step b.

It is also possible, however, that step b. and step c. are carried out at the same time. This can be done by leaving out the step of FIG. 5c while in FIG. 5f the mold is heated for carrying out step c.

Such variants are each understood to be within the purview of the invention. Thus, it is also possible to make the fourth sheet more form-retaining by calendering it in a step g. before the step according to FIG. 5a is carried out. After this, the method can be continued as has been discussed with reference to FIGS. 5a-5f. This means that calendering in step g. is carried out before step a. and step b. It is also possible that only the steps of FIGS. 5a, 5b, 5d, 5e, and 5f are carried out. Accordingly, the step c. of heating and the step d. of cooling are then omitted.

Also, still other embodiments of the pad are conceivable. The invention is by no means limited to the embodiments outlined. Thus, the second sheet can also comprise a foil and/or consist of a foil which is provided with a multiplicity of outflow openings and is made of a plastic. The outflow openings can for instance be circular and have a diameter of 0.15-0.6 mm. The plastic may be of a kind as discussed above. Also, it is conceivable that the second sheet comprises a first layer which consists at least substantially of PETP and a second layer which consists at least substantially of CPP. By heating the foil of the above-outlined kinds and bringing it in a desired shape and/or by appropriately choosing the thickness of the foil, the form retention of the second sheet can be adjusted to the desired level. Production of the pad can then take place as has been discussed with reference to FIG. 5. Also, the second sheet may be composed from such a foil and a layer of nonwoven material, such as, for example, filtering paper. This layer of nonwoven material can also consist of the nonwoven material which has been discussed above for the second sheet of the pad according to FIG. 1. This layer may be bonded to the foil by, for instance, heating. In addition, it holds for each of the above-outlined embodiments that the beverage preparation product may be tamped down and/or condensed, and thereby contributes to the form retention of the pad. Such tamping down and/or compaction may be carried out, for instance, in the situation of FIG. 5d, after which the pad is closed with the first sheet as discussed for FIGS. 5e and 5f. In each embodiment the beverage preparation product may be provided with ground coffee.

In addition, the second sheet may also be designed of different materials. Thus the second sheet may be made of a polyester fiber, in particular of Smash™ material. Preferably, it holds that the second sheet is made of SMASH™ 150 g/m2. Preferably, it holds here that the thickness of the second sheet is 250-450 μm, preferably 300-400 μm, more preferably 350 μm.

Also, it is possible that the second sheet is made of Polylactic Acid (PLA) fibers. Such PLA fibers are for instance described in WO 2012/027539. Preferably, it holds that the second sheet is made of PLA 60-120 g/m2, more preferably PLA 90 or 100 g/m2. In particular, furthermore, it may hold that the thickness of the sheet made of PLA is 100-600 μm (micrometer).

In particular, it holds furthermore that the second sheet is made of 100% Polylactic Acid (PLA) fibers and derivatives so that the second sheet is completely biodegradable after use. It preferably holds here that the second sheet is made of PLA fibers having a melting point of 145-175 degrees Celsius and PLA fibers having a melting point of 105-165 degrees Celsius. A combination of these two types of fibers provides on the one hand form retention of the second sheet and on the other coherence between the fibers.

According to an alternative, however, it holds that the second sheet consists for x % of Polylactic Acid (PLA) fibers and for (1−x) % of paper, with x being in the range of 50-80, preferably in the range of 60-70, more preferably approximately equal to 65. In particular it holds here that the PLA fibers have a melting point of 105-165 degrees Celsius.

In each of the cases outlined above, the fibers can have a length of 2-90 mm. Also, the fibers may be 0.6-6.0 denier. In particular, it holds that the first sheet is of more transparent design than the second sheet. The first sheet can then have the properties of the top sheet as discussed in EP 2 424 794. Also, it may hold that the second sheet is of at least substantially opaque design.

Figure 6:
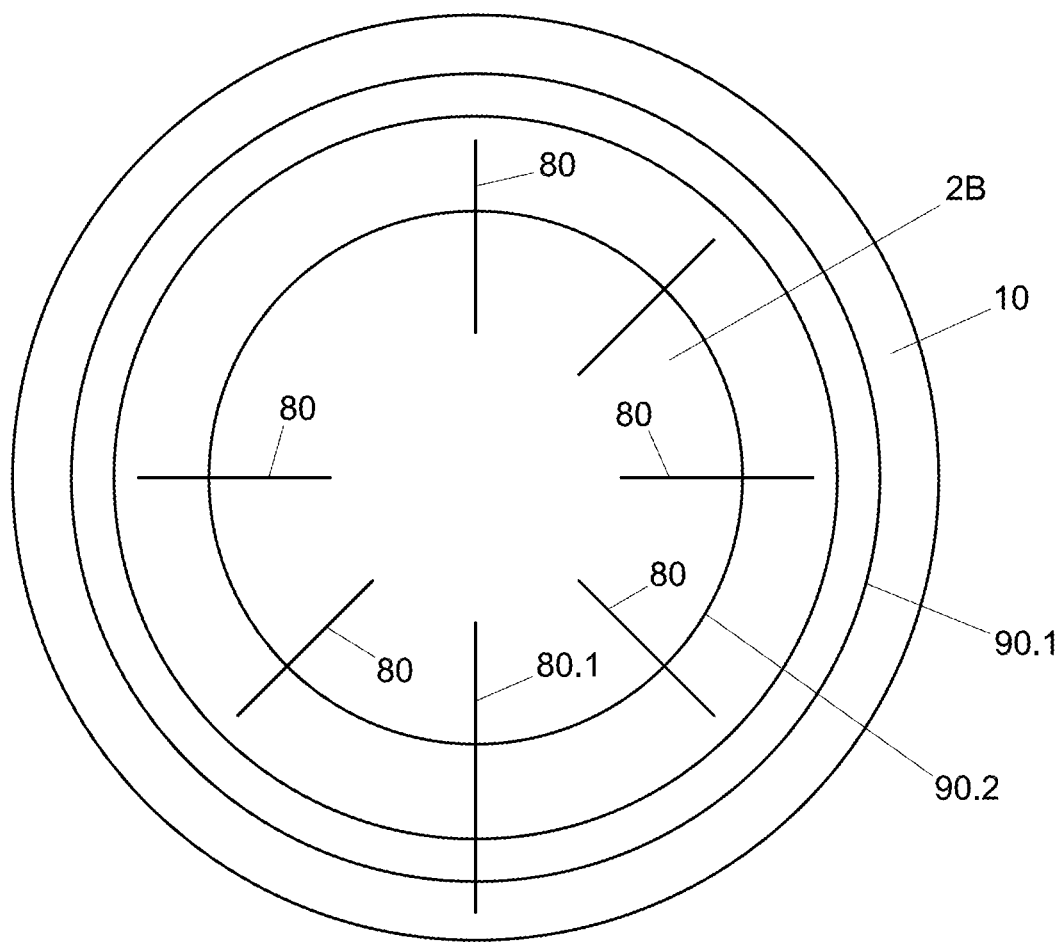
FIG. 6 shows an elevational view of the second sheet of a possible embodiment of the pad according to the invention.

In each of the embodiments outlined, the second sheet may have a smoothly running inner and outer surface within the sealing seam. However, in each of the above-outlined embodiments the second sheet may also be so configured as to be provided with at least one groove or a multiplicity of grooves to increase form retention of the second sheet, with the grooves 80 extending, for instance, in radial direction of the pad and/or with the at least one groove 90 constituting a circumferential groove closed upon itself, extending around an axial axis of the pad, for example in the sealing seam (groove 90.1) or in the second sheet outside the sealing seam so that the groove (90.2) has a smaller diameter than the sealing seam. This is shown in FIG. 6 in which a view of the second sheet is shown. The radial grooves 80 extend to near the sealing seam 10. It is also conceivable, however, that the radial grooves extend into the sealing seam 10 (indicated for one groove 80.1). The grooves in this example have a V-shaped cross section. Other shapes, such as a U-shaped cross section, are also possible. By providing the mold 52 with such grooves and providing the stamp 56 with ribs corresponding to these grooves, the fourth sheet and hence the second sheet can be provided with the respective grooves 80, 90 by carrying out with such a mold and stamp, as desired, one of the methods which have been discussed with reference to FIG. 5.

The invention claimed is:

1. A pad for use in a holder of a coffee-maker, where in use a fluid such as water is supplied under pressure to the pad so that the fluid is pressed through the pad for preparing 1 or 2 cups of beverage, the pad comprising:
    an envelope with an inner space which is filled with a beverage preparation product for preparing the beverage;
    the beverage preparation product comprising a product to be extracted with a fluid;
    the envelope being formed by two disc-shaped sheets, namely a planar flexible upper disc-shaped sheet and a lower dish-shaped sheet which are interconnected adjacent their peripheral edges to form interconnected peripheral edges, wherein the planar flexible upper disc-shaped sheet passes a fluid from outside the pad to the inner space, and wherein the lower dish-shaped sheet passes a beverage formed in the inner space from the inner space to outside of the pad;
    wherein the interconnected peripheral edges of the planar flexible upper disc-shaped sheet and the lower dish-shaped sheet form a sealing seam and define an original shape of the pad, wherein the planar flexible upper disc-shaped sheet and the lower dish-shaped sheet each are permeable and form a filter which can pass a fluid and which forms a barrier to the beverage preparation product;
    wherein the lower dish-shaped sheet is of form-retaining design, wherein the form-retaining design of the lower dish-shaped sheet retains the original shape of the pad when the pad is placed in the holder so that the lower dish-shaped sheet of the pad extends over a bottom of the holder up to an upstanding sidewall of the holder to inhibit fluid being supplied under pressure from bypassing and flowing around the pad;
    wherein the lower dish-shaped sheet comprises a plastic for at least 70 percent by weight, while the plastic consists of plastic fibers or plastic filaments;
    wherein the lower dish-shaped sheet comprises a nonwoven material;
    wherein the lower dish-shaped sheet further comprises cellulose fibers or cellulose filaments; and
    wherein the pad is disc-shaped, and the interconnected peripheral edges are each in a continuous flat plane with the planar flexible upper disc-shaped sheet, have the shape of a circle and have a diameter within the range of 45-90 mm.

2. The pad according to claim 1, wherein the lower dish-shaped sheet also remains form-retaining when a fluid is caused to flow through it, while the fluid can have a temperature of at most 99 degrees Celsius.

3. The pad according to claim 1, wherein the lower dish-shaped sheet comprises a thermoplastic material.

4. The pad according to claim 1, wherein the lower dish-shaped sheet also remains form-retaining when it comes into contact with a fluid having a temperature of 90 degrees Celsius.

5. The pad according to claim 1, wherein the lower dish-shaped sheet is made of a porous material.

6. The pad according to claim 1, wherein the plastic is present in at least a part of the nonwoven material in the form of plastic fibers or plastic filaments.

7. The pad according to claim 1, wherein the lower dish-shaped sheet comprises a plurality of layers of material which are bonded together.

8. The pad according to claim 1, wherein the lower dish-shaped sheet has been subjected to a step of calendering.

9. The pad according to claim 1, wherein an areal density of the lower dish-shaped sheet is in the range of 15-60 g/m$^2$ or in the range of 60-200 g/m$^2$ excluding 60 g/m$^2$.

10. The pad according to claim 1, wherein a thickness of the lower dish-shaped sheet is in the range of 50-400 µm or in the range of 400-500 µm excluding 400 µm.

11. The pad according to claim 10, wherein an areal density of the lower dish-shaped sheet is in the range of 15-60 g/m$^2$ or in the range of 60-200 g/m$^2$ excluding 60 g/m$^2$, and wherein the thickness of the lower dish-shaped sheet is in the range of 50-400 µm or in the range of 400-500 µm excluding 400 µm.

12. The pad according to claim 1, wherein the lower dish-shaped sheet comprises a foil which comprises a multiplicity of outflow openings and is made of a plastic.

13. The pad according to claim 12, wherein the plastic comprises one or more plastic polymers, wherein the one or more plastic polymers comprise polyethylene (PE), polyethylene terephthalate (PET), co-polyethylene terephthalate (coPET), linear low density polyethylene (LLDPE), cast polypropylene (CPP), polylactic acid (PLA), or polypropylene (PP).

14. The pad according to claim 13, wherein the lower dish-shaped sheet comprises a first layer of PETP and a second layer of CPP.

15. The pad according to claim 1, wherein the lower dish-shaped sheet comprises at least one groove to increase a form retention of the lower dish-shaped sheet, the at least one groove constituting a circumferential groove.

16. The pad according to claim 1, wherein a thickness of the lower dish-shaped sheet is 250-450 µm.

17. The pad according to claim 1, wherein the plastic in the lower dish-shaped sheet comprises Polylactic Acid (PLA) fibers.

18. The pad according to claim 17, wherein the lower dish-shaped sheet is made of PLA with an areal density of 60-120 g/m$^2$.

19. The pad according to claim 17, wherein a thickness of the lower dish-shaped sheet is 100-600 µm.

20. The pad according to claim 17, wherein the plastic in the lower dish-shaped sheet comprises 100% Polylactic Acid (PLA) fibers.

21. The pad according to claim 17, wherein the fibers have a length of 2-90 mm.

22. The pad according to claim 17, wherein the fibers are 0.6-60 denier.

23. The pad according to claim 17, wherein the lower dish-shaped sheet is made of a first type of PLA fibers having a melting point of 145-175 degrees Celsius and of a second type of PLA fibers having a melting point of 105-165 degrees Celsius.

24. The pad according to claim 1, wherein the lower dish-shaped sheet has been subject to a heat treatment.

25. The pad according to claim 1, wherein the planar flexible upper disc-shaped sheet is made of filtering paper.

26. The pad according to claim 1, wherein the planar flexible upper disc-shaped sheet is more transparent than the lower dish-shaped sheet.

27. The pad according to claim 1, wherein the lower dish-shaped sheet is opaque.

28. The pad according to claim 1, wherein the planar flexible upper disc-shaped sheet comprises cellulose fibers or that the planar flexible upper disc-shaped sheet comprises at least 70% by weight of cellulose.

29. The pad according to claim 1, wherein the planar flexible upper disc-shaped sheet is of form-retaining design or wherein the planar flexible upper disc-shaped sheet is of form-retaining design and is made of a same material as the lower dish-shaped sheet.

30. The pad according to claim 1, wherein the part of the lower dish-shaped sheet that is within the contours of the sealing seam is dish-shaped.

31. The pad according to claim 1, wherein the beverage preparation product consists of ground coffee which is condensed to a hard cake or that the beverage preparation product is condensed to a hard cake.

32. The pad according to claim 1, wherein the lower dish-shaped sheet comprises a plurality of grooves to increase a form retention of the lower dish-shaped sheet, wherein the plurality of grooves include one or more first grooves that extend in a radial direction of the pad.

33. The pad according to claim 32, wherein the plurality of grooves include one or more second grooves that extend circumferentially around an axial axis of the pad in the sealing seam.

34. The pad according to claim 32, wherein the plurality of grooves include one or more second grooves that extend circumferentially around an axial axis of the pad in the lower dish-shaped sheet outside the sealing seam so that the one or more second grooves has a smaller diameter than the sealing seam.

35. The pad according to claim 1, wherein the lower dish-shaped sheet also remains form-retaining when it comes into contact with a fluid having a temperature of 99 degrees Celsius.

36. A system for preparing a beverage, the system comprising:
a pad according to claim 1; and
a coffee-maker, wherein the coffee-maker includes a holder for receiving the pad, a cover for closing off the holder, and fluid means for generating a fluid flow under pressure, wherein the holder is provided with at least one beverage outflow opening and the cover is provided with at least one fluid inflow opening which are in fluid communication with the fluid means for supplying the fluid flow to the fluid openings so that the fluid is supplied under pressure to the planar flexible upper disc-shaped sheet of the pad so that the fluid is pressed through the pad for the preparation of the beverage in the pad, the beverage leaving the pad via the lower dish-shaped sheet to proceed to leave the holder via the at least one beverage outflow opening.

37. The system according to claim 36, wherein a fluid sealing is present between the lower dish-shaped sheet and the bottom of the holder, which fluid sealing prevents the fluid which is supplied to the planar flexible upper disc-shaped sheet of the pad from flowing around the pad to the beverage outflow opening.

38. The system according to claim 36, wherein the holder is provided with a bowl-shaped inner space, which is bounded by the bottom and an upstanding sidewall of the holder, wherein the bottom consists of an outer horizontally directed ring-shaped bottom part which adjoins the sidewall and an inner dish-shaped bottom part which adjoins an inner edge of the ring-shaped bottom part, wherein the dish-shaped bottom part adjacent the ring-shaped bottom part slopes downwards in a direction directed away from the sidewall and to an inside of the holder and wherein the at least one beverage outflow opening is provided in the dish-shaped bottom part.

39. The system according to claim 38, wherein the ring-shaped bottom part is directed horizontally.

40. The system according to claim 38, wherein an underside of the sidewall is connected with the ring-shaped bottom part adjacent an outer edge of the ring-shaped bottom part.

41. The system according to claim 38, wherein the pad rests on the bottom, while the lower dish-shaped sheet extends along the bottom to near the upstanding wall.

42. The system according to claim 38, wherein the sealing seam of the pad rests on the ring-shaped bottom part.

43. The system according to claim 38, wherein the lower dish-shaped sheet has a shape corresponding to the shape of the bottom of the holder.

44. The system according to claim 38, wherein in the dish-shaped bottom part grooves are provided which form a fluid path to the at least one beverage outflow opening, while the grooves extend exclusively under the beverage preparation product in the pad.

45. The system according to claim 44, wherein the dish-shaped second bottom part comprises an inner flat bottom part, with the grooves provided in the inner flat bottom part.

46. The system according to claim 44, wherein a fluid sealing is present between the lower dish-shaped sheet and the bottom of the holder, there where the bottom is not provided with grooves, which fluid sealing prevents the fluid which is supplied to the planar flexible upper disc-shaped sheet of the pad from flowing around the pad to the beverage outflow opening.

47. The system according to claim 36, wherein the at least one outflow opening is provided with a nozzle for generating a jet of the beverage.

48. The system according to claim 47, wherein the system is further provided with an impact surface which is impacted by the jet for beating air into the beverage to obtain a beverage with a fine-bubble foam layer.

49. The system according to claim 36, wherein the fluid is supplied to the planar flexible upper disc-shaped sheet with a pressure of 0.9-1.5 bar above atmospheric pressure.

50. The system according to claim 36, wherein a bottom of the holder is made of a hard plastic or metal and is of smooth design.

51. The system according to claim 36, wherein the system is further provided with a second coffee pad provided with an inner space which is filled with ground coffee, wherein the inner space is formed by a first sheet and a lower dish-shaped sheet which are interconnected adjacent their longitudinal edges, wherein the first sheet and the lower dish-shaped sheet also form an outer side of the pad and are each made of flexible filtering paper and wherein the coffee pad and the holder are tailored to each other so that the coffee pad can be received in the holder for preparing coffee, wherein the lower dish-shaped sheet extends over a bottom of the holder and wherein, in use, the fluid is supplied under pressure to the first sheet of the pad and is pressed through the pad so that the fluid flows through the first sheet, whereby in the pad a coffee extract is formed which proceeds to leave the pad via the lower dish-shaped sheet and wherein the coffee extract proceeds to flow out of the holder via the beverage outflow opening of the holder, wherein preferably the first sheet is of flat design and the lower dish-shaped sheet has the shape of the bottom.

* * * * *